G. M. PETERS.
FENDER.
No. 176,443. Patented April 25, 1876.
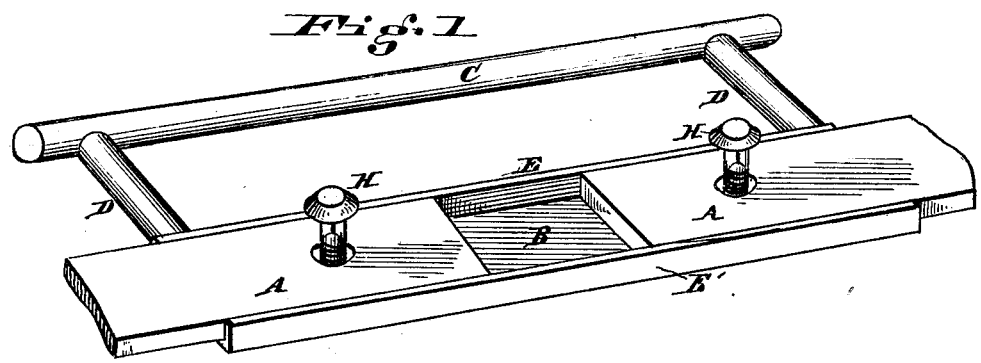
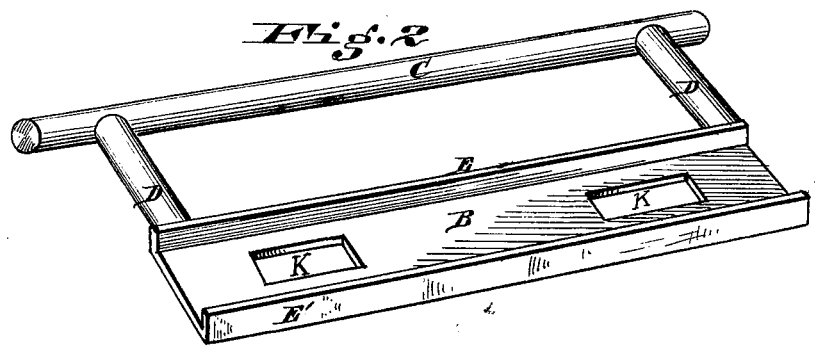
Attest
Inventor
George M. Peters.

UNITED STATES PATENT OFFICE.

GEORGE M. PETERS, OF COLUMBUS, OHIO.

IMPROVEMENT IN FENDERS.

Specification forming part of Letters Patent No. 176,443, dated April 25, 1876; application filed June 19, 1875.

*To all whom it may concern:*

Be it known that I, GEORGE M. PETERS, a resident of the city of Columbus, in the county of Franklin and State of Ohio, have invented certain new and useful Improvements in Rub-Irons for Vehicle - Bodies, of which the following is a specification:

Rub-irons are those irons which are attached to vehicles, and serve as a fender to receive the rub of the wheels of the vehicle, and protect the latter from injury.

My invention relates to that class of rub-irons which are to be attached to a vehicle-body; and my invention consists, first, in the application of the rub-iron to the adjacent ends of the halves of the body-loop in such a manner that the rub-iron shall perform its function as a rub-iron, and also act as a splice or connection to hold said two ends of the loop together.

The advantages of this part of my invention are, that it saves the welding together of the ends of the halves of the body-loops, and also saves handling and fitting a long loop, it being much easier to fit half a loop than a whole one, and much easier to repair or remove a half loop than a whole loop in case of breakage thereof or of accident thereto.

A second feature of my invention consists in a novel conformation of the rub-iron, whereby one or both ends of each half of the body-loop, at and near the point where they are held in splice, are concealed from view, and a smooth and uniform appearance is given to the body-loop.

In the accompanying drawings, making a part of this specification, Figure 1 represents a rub-iron illustrating the second feature of my invention, and combined with the ends of the two halves of a body-loop in such a manner as to illustrate the features of the first part of my invention. Fig. 2 represents the rub-iron of Fig. 1, the ends of the halves of the body-loop being omitted.

When the rub-iron is shaped like that shown in the drawing, that portion of the rub-iron which receives the rub or wear of the wheel is a round bar, C. This bar C is united to the flange or raised edge E by means of the arms D. The bottom of flange E is cast or rigidly attached to the bottom B. A flange or raised edge, E', similar to the flange E just mentioned, is attached to that edge of bottom B which is opposite to that edge of B which is united to E. Both flanges project at right angles to the plane of the bottom B, and on the same side of the said bottom. The width of the bottom B between the flanges E and E' is greater or less, according to the width of the ends of the loops it is to receive. In the bottom B are slots or holes K for the reception of the bolts H. I say slots or holes; slots are, however, preferable, as affording a better opportunity to make the hole in the end of each loop A match the opening K in the bottom without drilling or cutting the bottom. The ends of the halves of the loops are bored, as shown in the drawing, Fig. 1, and a bolt, H, is passed through the loop, as shown, and through the opening K in the bottom, and through the bottom of the vehicle-body. A nut on the other end of each bolt secures the latter in position, while in the drawing that part of the rub-iron which receives the rub of the wheel is joined to the flange E by the arm D alone; yet I do not limit my invention to a rub-iron of this precise construction.

The rod C may be connected to the flange E by means of a continuous web of metal; or the web and arms may be alike dispensed with, and the flange E, by a slight enlargement, be made to perform the office of rod C. None of these variations will interfere with the success of the first and second features of my invention.

The flanges E E' are not essential to the accomplishment of the first feature of my invention, as the neighboring ends of the body-loop can be held in perfect splice by bolting them to the bottom B of a rub-iron having no flanges E E'.

I am, so far as I am aware, the first to employ a rub-iron to splice together the ends of the two halves of the body-loops.

In carrying out practically the purpose of the second feature of my invention, I can dispense with the inner flange E and yet give a smooth and uniform appearance to the outside edge of the body-loops at the point where they are spliced together, the outside edge of said loops being the part most exposed to view.

When flange E' is dispensed with there is this advantage, viz., that no matter what is the width of the loop it (the loop) can be bolted to the rub-iron without the necessity of first altering the rub-iron. On the other hand, when the rub-iron has both the outer flange E and the inner flange E', the splice of the loops is concealed on both sides of the loop, and on both sides a smooth and uniform appearance is imparted to the body-loop.

What I claim as new, and desire to secure by Letters Patent, is—

1. A rub-iron, in combination with the adjacent ends of the halves of a body-loop and a vehicle-body, as a splice for said halves.

2. A rub-iron provided with an outer flange and an inner flange, substantially as and for the purposes specified.

3. The adjacent halves of a body-loop, in combination with a rub-iron provided with one or two flanges, and one or more openings through it to receive bolts or screws to secure the rub-iron over the spliced loop and to the vehicle-body.

GEORGE M. PETERS.

Witnesses:
T. J. JANNEY,
J. B. JOHNS.